US012412385B2

(12) United States Patent
Nichols et al.

(10) Patent No.: US 12,412,385 B2
(45) Date of Patent: *Sep. 9, 2025

(54) APPARATUS AND METHOD FOR VEHICLE PROFILING

(71) Applicant: Quick Quack Car Wash Holdings, LLC, Roseville, CA (US)

(72) Inventors: Joseph Matthew Nichols, Rocklin, CA (US); Christopher Clinton Chappell, Lincoln, CA (US); Mcnamara Marlow Pope, III, Fair Oaks, CA (US); Rodney Daniel Sparks, Antelope, CA (US); Josh David Schumacher, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,471

(22) Filed: Jan. 12, 2024

(65) Prior Publication Data

US 2024/0378876 A1    Nov. 14, 2024

Related U.S. Application Data

(63) Continuation of application No. 18/195,760, filed on May 10, 2023, now Pat. No. 11,908,182.

(51) Int. Cl.
*G06V 10/82* (2022.01)
*B60S 1/00* (2006.01)
*G01S 17/89* (2020.01)
*G06V 20/64* (2022.01)

(52) U.S. Cl.
CPC ............... *G06V 10/82* (2022.01); *B60S 1/00* (2013.01); *G01S 17/89* (2013.01); *G06V 20/64* (2022.01)

(58) Field of Classification Search
CPC .......... G06V 10/82; G06V 20/64; B60S 1/00; G01S 17/89
See application file for complete search history.

(56) References Cited

U.S. PATENT DOCUMENTS

| | | | | |
|---|---|---|---|---|
| 5,432,415 A * | 7/1995 | Ittah | ...................... | B60S 1/0855 318/483 |
| 8,049,643 B2 * | 11/2011 | Ness | .................... | G08G 1/0175 701/1 |
| 10,762,572 B1 * | 9/2020 | Hopkins | .................. | G06T 5/20 |

(Continued)

FOREIGN PATENT DOCUMENTS

| | | |
|---|---|---|
| DE | 102021205145 A1 | 11/2022 |
| KR | 10-2484704 B1 | 1/2023 |
| KR | 10-2504548 B1 | 3/2023 |

*Primary Examiner* — Utpal D Shah
(74) *Attorney, Agent, or Firm* — Caldwell Intellectual Property Law

(57) ABSTRACT

An apparatus for vehicle profiling, the apparatus including at least a sensor, wherein the at least a sensor is configured to capture vehicle data of a vehicle; at least a processor; and a memory communicatively connected to the at least processor, the memory contains instructions configuring the at least processor to receive the vehicle data from the at least a sensor; generate a graphic model of the vehicle as a function of the vehicle data; determine a vehicle status as a function of the vehicle data; classify the vehicle status and the vehicle data into one or more vehicle status groups wherein the vehicle status includes at least a vehicle measurement; and generate a vehicle report as a function of the one or more vehicle status groups.

20 Claims, 8 Drawing Sheets

(56) References Cited

U.S. PATENT DOCUMENTS

| | | |
|---|---|---|
| 10,809,673 B2 | 10/2020 | Ray |
| 11,640,170 B1* | 5/2023 | Bagwell ................ G01S 17/931 |
| | | 701/23 |
| 2010/0186778 A1* | 7/2010 | Martin .................... B08B 3/024 |
| | | 134/113 |
| 2018/0025624 A1* | 1/2018 | Ness ....................... G06T 7/251 |
| | | 714/47.2 |
| 2020/0142363 A1* | 5/2020 | Ray ................... G05B 13/0285 |
| 2022/0048478 A1* | 2/2022 | McGovern ............. B05B 1/205 |
| 2022/0250245 A1* | 8/2022 | Panigrahi ............ G01M 17/007 |
| 2023/0156439 A1* | 5/2023 | Mayer .................... B60S 3/066 |
| | | 134/18 |

* cited by examiner

APPARATUS AND METHOD FOR VEHICLE PROFILING

CROSS-REFERENCE TO RELATED APPLICATIONS

This application is a continuation of Non-provisional application Ser. No. 18/195,760 filed on May 10, 2023 and entitled "APPARATUS AND METHOD OF VEHICLE PROFILING," the entirety of which is incorporated herein by reference.

FIELD OF THE INVENTION

The present invention generally relates to the field of vehicle profiling. In particular, the present invention is directed to apparatus and method of vehicle profiling.

BACKGROUND

Vehicle profiling is the process of collecting and analyzing information about a vehicle and its driver to make informed decisions. Currently, vehicle profiling is done manually. This manual process is time-consuming and prone to errors. Existing techniques does not suffice to alleviate these problems.

SUMMARY OF THE DISCLOSURE

In an aspect, an apparatus for vehicle profiling is described. The apparatus includes at least a sensor, wherein the at least a sensor is configured to capture vehicle data of a vehicle, at least a processor and a memory communicatively connected to the at least processor, the memory contains instructions configuring the at least processor to receive the vehicle data from the at least a sensor, generate a graphic model of the vehicle as a function of the vehicle data, determine a vehicle status as a function of the vehicle data, classify the vehicle status and the vehicle data into one or more vehicle status groups and generate a vehicle report as a function of the one or more vehicle status groups.

In another aspect, a method for vehicle profiling is described. The method includes capturing, using at least a sensor, vehicle data, receiving, using at least a processor, the vehicle data from the at least a sensor, generating, using the at least a processor, a graphic model of the vehicle as a function of the one or more vehicle status groups, determining, using the at least a processor, a vehicle status of the vehicle as a function of the vehicle data, classifying, using the at least a processor, the vehicle status and the vehicle data into one or more vehicle status groups and generating, using the at least a processor, a vehicle report as a function of the one or more vehicle status groups.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and method for vehicle profiling. The apparatus includes at least a sensor, wherein the at least a sensor is configured to capture vehicle data of a vehicle, at least a processor and a memory communicatively connected to the at least processor, the memory contains instructions configuring the at least processor to receive the vehicle data from the at least a sensor, generate a graphic model of the vehicle as a function of the vehicle data, determine a vehicle status as a function of the vehicle data, classify the vehicle status and the vehicle data into one or more vehicle status groups and generate a vehicle report as a function of the one or more vehicle status groups.

Aspects of the present disclosure can be used to clean a vehicle in a car wash. Aspects of the present disclosure can also be used for automatic car wash system. This is so, at least in part, because at least a processor may be configured to generate a wash command as a function of a vehicle report. Exemplary embodiments illustrating aspects of the present disclosure are described below in the context of several specific examples.

Figure 1:
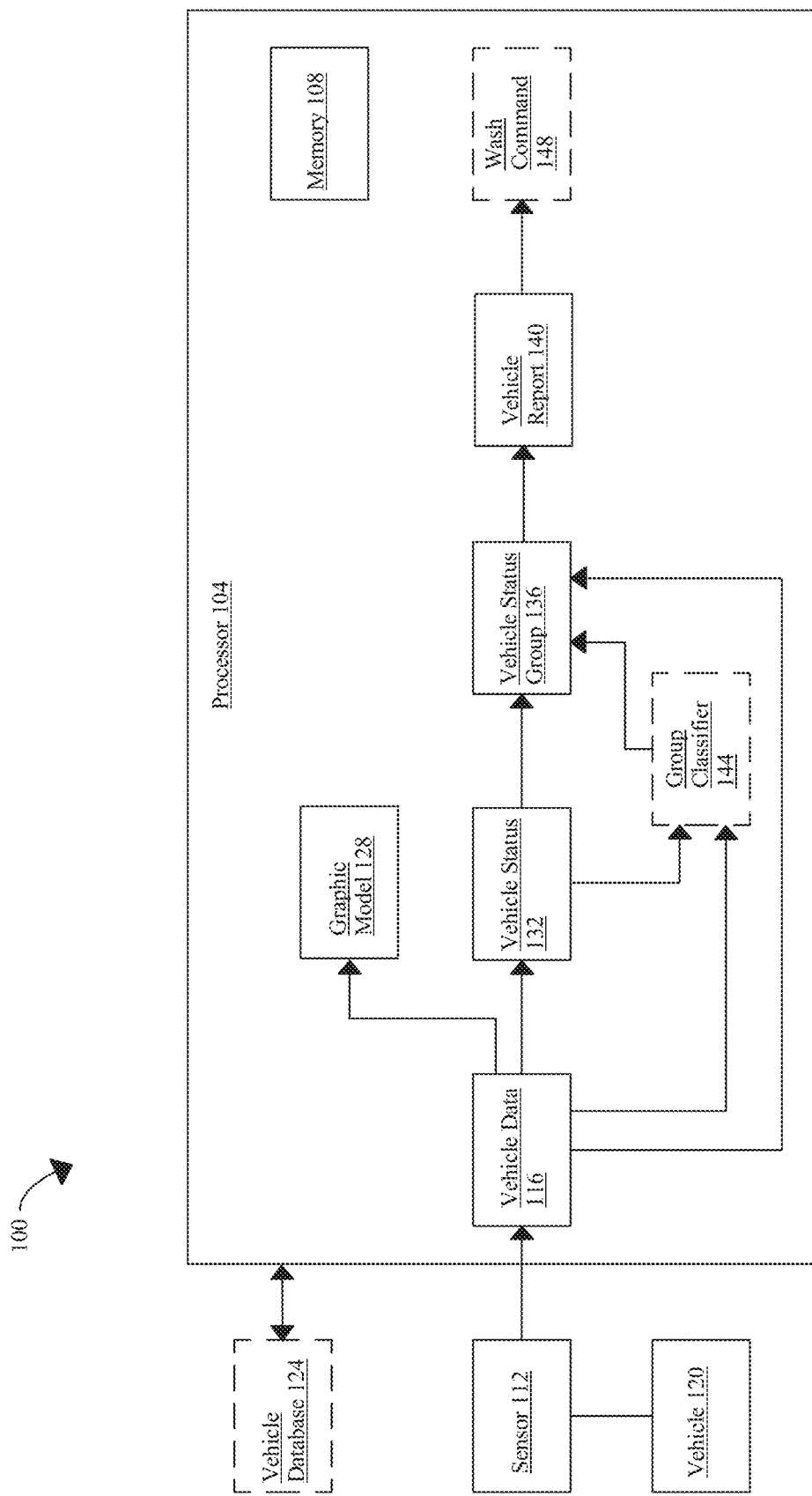
FIG. 1 is a block diagram of an exemplary embodiment of an apparatus of vehicle profiling.

Referring now to FIG. 1, an exemplary embodiment of an apparatus 100 for vehicle profiling is illustrated. The apparatus 100 includes at least a processor 104. The at least a processor 104 may include, without limitation, any processor described in this disclosure. The at least a processor 104 may be included in a computing device. The at least a processor 104 may include any computing device as described in this disclosure, including without limitation a microcontroller, microprocessor, digital signal processor (DSP) and/or system on a chip (SoC) as described in this disclosure. The at least a processor 104 may include, be included in, and/or communicate with a mobile device such as a mobile telephone or smartphone. The at least a processor 104 may include a single computing device operating independently, or may include two or more computing device operating in concert, in parallel, sequentially or the like; two or more computing devices may be included together in a single computing device or in two or more computing devices. The at least a processor 104 may interface or communicate with one or more additional devices as described below in further detail via a network interface device. Network interface device may be utilized for connecting the at least a processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The at least a processor 104 may include but is not limited to, for example, a computing device or cluster of computing devices in a first location and a second computing device or cluster of computing devices in a second location. The at least a processor 104 may include one or more computing devices dedicated to data storage, security, distribution of traffic for load balancing, and the like. The at least a processor 104 may distribute one or more computing tasks as described below across a plurality of computing devices of computing device, which may operate in parallel, in series, redundantly, or in any other manner used for distribution of tasks or memory between computing devices. The at least a processor 104 may be implemented, as a non-limiting example, using a "shared nothing" architecture.

With continued reference to FIG. 1, at least a processor 104 may be designed and/or configured to perform any method, method step, or sequence of method steps in any embodiment described in this disclosure, in any order and with any degree of repetition. For instance, the at least a processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The at least a processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, an apparatus 100 includes a memory 108 communicatively connected to at least a processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, an apparatus 100 includes at least a sensor 112. In some embodiments, the at least a sensor 112 is configured to capture vehicle data 116 of a vehicle 120 as described below. For the purposes of this disclosure, a "sensor" is a device that produces an output signal for the purpose of sensing a physical phenomenon. In some embodiments, the at least a sensor 112 may include a plurality of sensors 112. As a non-limiting example, the apparatus 100 may include the plurality of sensors 112 in multiple locations of a space. For the purposes of this disclosure, a "space" is any physical space. As a non-limiting example, the space may include a self-service car wash, automatic car wash, touchless carwash, a garage, a car wash booth, a room, and the like. For the purposes of this disclosure, a "car wash" is a space where a vehicle can be cleaned. For example and without limitation, the plurality of sensors 112 may be on a ceiling, four sides of the space, floor, corners, and the like, of the space. For another example and without limitation, the plurality of sensors 112 may be above, below, in front of, behind, or to the sides of the vehicle 120. For the purposes of this disclosure, a "vehicle" is any means in or by which someone or something may be transported. As a non-limiting example, the vehicle 120 may include a car, truck, bus, motorcycle, bicycle, watercraft, aircraft, and the like. In an embodiment, the at least a sensor 112 may be fixed on a surface of the space. In another embodiment, the at least a sensor 112 may be movable. As a non-limiting example, the at least a sensor 112 may be movable using an automatic slider, where the automatic slider may allow the at least a sensor 112 from side to side, from top to bottom, over an object, from front to back, or any combination of thereof. In some embodiments, any signals or data generated from the at least a sensor 112 may be stored in a vehicle database 124. The vehicle database 124 disclosed herein is further described in detail below.

With continued reference to FIG. 1, in some embodiments, at least a sensor 112 may include a waterproof feature. For the purposes of this disclosure, a "waterproof feature" is an attribute of being water-resistant. Additional disclosure related to the waterproof feature may be found in U.S. patent application Ser. No. 18/195,719, filed on May 10, 2023, entitled "SYSTEMS FOR IMAGE PROJECTION,", the entirety of which is incorporated as a reference. In some embodiments, the at least a sensor 112 may include a cooling function. For the purposes of this disclosure, a "cooling function" is a function that reduce thermal energy of at least a sensor.

With continued reference to FIG. 1, in some embodiments, at least a sensor 112 may include a temperature sensor, force sensor, pressure sensor, moisture sensor, flow sensor, electrical sensor, mechanical sensor, motion sensor, camera, photodetector, and the like. For example and without limitation, the at least a sensor 112 may transduce a detected phenomenon, such as without limitation, temperature, voltage, current, pressure, speed, motion, light, moisture, and the like, into a sensed signal. In some embodiments, the at least a sensor 112 may output the sensed signal. As a non-limiting example, the sensed signal (or also referred as an electrical signal, output signal, and the like) may include sensor data and/or LiDAR data of vehicle data 116 as described below. The at least a sensor 112 may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by the at least a sensor 112 may include circuitry, computing devices, electronic components or a combination thereof that translates into at least an electronic signal configured to be transmitted to another electronic component.

With continued reference to FIG. 1, in some embodiments, at least a sensor 112 may include a sensor suite which may include a plurality of sensors 112 that may detect similar or unique phenomena. For example, in a non-limiting embodiment, sensor suite may include a plurality of motion sensors or a mixture of motion sensors and a camera. The apparatus 100 may include a plurality of sensors 112 in the form of individual sensors 112 or a sensor suite working in tandem or individually. A sensor suite may include a plurality of independent sensors 112, as described in this disclosure, where any number of the described sensors 112 may be used to detect any number of physical or electrical quantities associated with a vehicle 120. Independent sensors 112 may include separate sensors 112 measuring physical or electrical quantities that may be powered by and/or in communication with circuits independently, where each may signal sensor output to a control circuit such as but not limited to at least a processor 104. In one or more embodiments, at least a sensor 112 may include a sense board, such as sense board. A sense board may have at least a portion of a circuit board that includes one or more sensors 112 configured to, for example, measure a height of the vehicle 120. In one or more embodiments, the at least a sensor 112 or a sense board may be communicatively connected to the at least a processor 104. In one or more embodiments, a sense board may include one or more circuits and/or circuit elements, including, for example, a printed circuit board component. A sense board may include, without limitation, a control circuit configured to perform and/or direct any actions performed by the sense board and/or any other component and/or element described in this disclosure. The control circuit may include any analog or digital control circuit, including without limitation a combinational and/or synchronous logic circuit, a processor, microprocessor, microcontroller, or the like.

With continued reference to FIG. 1, in some embodiments, at least a sensor 112 may include at least a camera. In some embodiments, an apparatus 100 may include a plurality of cameras. As used in this disclosure, a "camera" is a device that is configured to sense electromagnetic radiation, such as without limitation visible light, and generate an image representing the electromagnetic radiation. In some cases, the at least a camera may include one or more optics. Exemplary non-limiting, the optics may include spherical lenses, aspherical lenses, reflectors, polarizers, filters, windows, aperture stops, and the like. In some cases, the at least a camera may include an image sensor. Exemplary non-limiting, the image sensors may include digital image sensors, such as without limitation charge-coupled device (CCD) sensors and complimentary metal-oxide-semiconductor (CMOS) sensors, chemical image sensors, and analog image sensors, such as without limitation film. In some cases, the at least a camera may be sensitive within a non-visible range of electromagnetic radiation, such as without limitation infrared. In some embodiments, the at least a camera may generate image data, where vehicle data 116 may include the image data as described below. As used in this disclosure, "image" is information representing at least a physical scene, space, and/or object. As a non-limiting example, the image data may include an image of a vehicle 120, a license plate, door, window, handle, and the like of the vehicle 120, a driver of the vehicle 120, and the like. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image.

With continued reference to FIG. 1, an exemplary camera may include an OpenMV Cam H7 from OpenMV, LLC of Atlanta, Georgia, U.S.A. OpenMV Cam includes a small, low power, microcontroller which allows execution of processes. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, detect and decode barcodes; capture images; and record video.

With continued reference to FIG. 1, in some embodiments, a camera may include a plurality of cameras, wherein the plurality of cameras may capture two or more perspectives for use in three-dimensional (3D) reconstruction. The camera may include a stereo-camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera may include TaraXL from e-con Systems, Inc of San Jose, California. The TaraXL may include a USB 3.0 stereo-camera which is optimized for NVIDIA® Jetson AGX Xavier™/Jetson™ TX2 and NVIDIA GPU Cards. The TaraXL's accelerated Software Development Kit (TaraXL SDK) may be capable of doing high quality 3D depth mapping of WVGA at a rate of up to 60 frames per second. The TaraXL may be based on MT9V024 stereo sensor from ON Semiconductor. Additionally, the TaraXL may include a global shutter, houses 6 inertial measurement units (IMUs), and may allow mounting of optics by way of an S-mount lens holder. The TaraXL may operate at depth ranges of about 50 cm to about 300 cm. Persons skilled in the art, upon reviewing the entirety of this disclosure, will be aware of various types of cameras that may be used for the disclosure.

With continued reference to FIG. 1, in some embodiments, at least a sensor 112 may include at least a photodetector. For the purposes of this disclosure, a "photodetector" is any device that is sensitive to light and thereby able to detect light. In some embodiments, the at least a photodetector may be implemented in a camera. As a non-limiting example, the at least a photodetector may convert the light into electrical signals that can be processed by the camera's electronics to create an image. In some embodiments, the at least a photodetector may be implemented in the LiDAR system as described below. As a non-limiting example, the at least a photodetector may receive laser light from a light detecting and ranging (LiDAR) system that reflects off an object, such as but not limited to a vehicle 120, or environment and may convert it into an electrical signal, such as but not limited to LiDAR data of vehicle data 116. The LiDAR data and the vehicle data 116 disclosed herein are further described in detail below. In some cases, at least a photodetector may be communicative with a computing device such as but not limited to at least a processor 104, such that the sensed signal such as but not limited to the LiDAR data of the vehicle data 116 may be communicated with the at least a processor 104. In some embodiments, the electrical signal from the at least a photodetector may be stored in a vehicle database 124. The vehicle database 124 disclosed herein is further described below.

With continued reference to FIG. 1, in some cases, at least a photodetector may include a photodiode, a photoresistor, a photosensor, a photovoltaic chip, and the like. In some cases, the at least a photodetector may include a Germanium-based photodiode. The at least a photodetector may include, without limitation, Avalanche Photodiodes (APDs), Single Photon Avalanche Diodes (SPADs), Silicon Photomultipliers (SiPMs), Photo-Multiplier Tubes (PMTs), Micro-Channel Plates (MCPs), Micro-Channel Plate Photomultiplier Tubes (MCP-PMTs), Indium gallium arsenide semiconductors (InGaAs), photodiodes, and/or photosensitive or photon-detecting circuit elements, semiconductors and/or transducers. "Avalanche Photo Diodes (APDs)," as used herein, are diodes (e.g., without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When the reverse bias is less than the breakdown voltage, the gain of the APD may be approximately linear. For silicon APDs, this gain may be on the order of 10-100. Material of APD may contribute to gains. Germanium APDs may detect infrared out to a wavelength of 1.7 micrometers. InGaAs may detect infrared out to a wavelength of 1.6 micrometers. Mercury Cadmium Telluride (HgCdTe) may detect infrared out to a wavelength of 14 micrometers. An APD reverse biased significantly above the breakdown voltage may be referred to as a Single Photon Avalanche Diode, or SPAD. In this case, the n-p electric field may be sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode.

With continued reference to FIG. 1, in some embodiments, at least a photodetector may include a charge-coupled device (CCD), a complementary metal-oxide-semiconductor (CMOS) sensor, and the like. As a non-limiting example, the CCD sensor may include an array of tiny pixels that are sensitive to light. As another non-limiting example, the CMOS sensor may include an array of photodiodes. In both CCD and CMOS sensors, the electrical charge generated by the photodetector may be converted into a voltage signal, which may be then amplified and converted into a digital signal by a camera's analog-to-digital converter (ADC). The digital signal may be then processed by the camera's electronics to create an image.

With continued reference to FIG. 1, in some embodiments, at least a photodetector of at least a sensor 112 may be implemented in a light detection and ranging (LiDAR) system. In some embodiments, an apparatus 100 may include the LiDAR system. For the purposes of this disclosure, a "light detection and ranging system" is a system for determining ranges by targeting an object or a surface with a laser and measuring the time for the reflected light to return to a receiver. As a non-limiting example, the LiDAR system may include a range-imaging camera, wherein the range-imaging camera that may be included in at least a sensor 112, that may include Intel® RealSense™ D430 Module, from Intel® of Mountainview, California, U.S.A. The D430 Module may include active infrared (IR) illumination and a stereoscopic camera, having global shutters and frame rate of up to 90 fps. The D430 Module may provide a field of view (FOV) of 85.2° (horizontal) by 58° (vertical) and an image resolution of 1280×720. In some embodiments, the range-sensing camera may be operated independently by dedicated hardware or, in some cases, range-sensing camera may be operated by a computing device. In some cases, the range-sensing camera may include software and firmware resources (for execution on hardware, such as without limitation dedicated hardware or a computing device). The D430 Module may be operated using software resources including but not limited to Intel® RealSense™ SDK 2.0, which may include opensource cross platform libraries.

With continued reference to FIG. 1, in some embodiments, a LiDAR system may include an optical source. For the purposes of this disclosure, an "optical source" is any device configured to emit electromagnetic radiation. As a non-limiting example, the electromagnetic radiation (also referred as light, laser, laser light, and the like) may include ultraviolet (UV), visible light, infrared light, and the like. In some embodiments, the LiDAR system may emit the electromagnetic radiation to an object such as but not limited to a vehicle 120 using the optical source. In some cases, the optical source may include a non-coherent optical source configured to emit non-coherent light, for example a light emitting diode (LED). In some cases, the optical source may emit a light having substantially one wavelength. In some cases, the optical source may emit the light having a wavelength range. The light may have a wavelength in an ultraviolet range, a visible range, a near-infrared range, a mid-infrared range, and/or a far-infrared range. For example, in some cases the light may have a wavelength within a range from about 100 nm to about 20 micrometers. For another example, in some cases the light may have the wavelength within a range from about 500 nm to about 1550 nm. The optical source may include, one or more diode lasers, which may be fabricated, without limitation, as an element of an integrated circuit; diode lasers may include, without limitation, a Fabry Perot cavity laser, which may have multiple modes permitting outputting light of multiple wavelengths, a quantum dot and/or quantum well-based Fabry Perot cavity laser, an external cavity laser, a mode-locked laser such as a gain-absorber system, configured to output light of multiple wavelengths, a distributed feedback (DFB) laser, a distributed Bragg reflector (DBR) laser, an optical frequency comb, and/or a vertical cavity surface emitting laser. The optical source may additionally or alternatively include a light-emitting diode (LED), an organic LED (OLED) and/or any other light emitter.

With continued reference to FIG. 1, in some embodiments, a LiDAR system may include optics. For the purposes of this disclosure, an "optic" is a device that focus and direct electromagnetic radiation to a target area. As a non-limiting example, the optics may include lenses, mirrors, filters, and the like. In some embodiments, the LiDAR system may include a scanner. For the purposes of this disclosure, a "scanner" is a rotating mirror or prism that directs laser in different directions. In some embodiments, the scanner may scan the laser in a horizontal, vertical pattern and wide arrange of angles to create a 3D point cloud of an object such as but not limited to a vehicle 120 or environment.

With continued reference to FIG. 1, in some embodiments, a LiDAR system may include timing electronics. For the purposes of this disclosure, a "timing electronic" is a device that is configured to control the timing and synchronization of an optical source, scanner, and photodetector. In an embodiment, the timing electronics may be configured to ensure that a laser pulse is emitted at the correct time and that the photodetector receives the reflected light at the appropriate time. In another embodiment, the timing electronics may be configured to coordinate the movement of the scanner to ensure that the laser pulse is directed towards a target area and that the reflected light is detected from the correct angle. In some embodiments, the timing electronics may include a timing circuit, which may generate precise pulses at a specific frequency. When the reflected light returns to the LiDAR system, it may be detected by the at least a photodetector. In some embodiments, the timing electronics may be configured to measure time-of-flight of the laser pulse. For the purposes of this disclosure, "time-of-flight" is the time it takes for a pulse of light to travel to a target area and back to a LIDAR system. In some embodiments, based on the time-of-flight measurement and the speed of light, the distance to the target, such as but not limited to a vehicle 120, can be calculated. In some embodiments, the timing electronics may be communicative with at least a processor 104. As a non-limiting example, the at least a processor may process data from the at least a photodetector and the timing electronics, such as but not limited to LiDAR data of vehicle data 116 to create a graphic model 128 of the vehicle 120. In some embodiments, the timing electronics may be communicative with a vehicle database 124, where the vehicle database 124 is described below. As a non-limiting example, the vehicle database 124 may include the data from the at least a photodetector and the timing electronics. As another non-limiting example, the at least a processor 104 may retrieve the LiDAR data from the vehicle database 124.

With continued reference to FIG. 1, in some embodiments, apparatus 100 may include a vehicle database 124. As used in this disclosure, "vehicle database" is a data structure configured to store data associated with a vehicle. As a non-limiting example, the vehicle database 124 may store vehicle data 116, vehicle status 132, one or more vehicle status groups 136, graphic model 128, vehicle report 140, user data, and the like. In one or more embodiments, the vehicle database 124 may include inputted or calculated information and datum related to a vehicle 120 and a user, such as but not limited to a driver. For the purposes of this disclosure, a "user" is any person or individual that is using or has used an apparatus. As a non-limiting example, the user may include a driver of a vehicle 120, a passenger of the vehicle 120, a car wash employee, a car wash employer, a technician, and the like. In some embodiments, a datum history may be stored in a vehicle database 124. As a non-limiting example, the datum history may include real-time and/or previous inputted data related to the vehicle 120, such as but not limited to the vehicle data 116, the vehicle status 132, the one or more vehicle status groups 136, the graphic model 128, the vehicle report 140, the user data, and the like. In one or more embodiments, the vehicle database 124 may include real-time or previously determined data related to the vehicle 120 as described above. As a non-limiting example, the vehicle database 124 may include instructions from a user, who may be an expert user, a past user in embodiments disclosed herein, or the like, where the instructions may include examples of the data related to the vehicle 120.

With continued reference to FIG. 1, in some embodiments, at least a processor 104 may be communicatively connected with a vehicle database 124. For example, and without limitation, in some cases, the vehicle database 124 may be local to the at least a processor 104. In another example, and without limitation, the vehicle database 124 may be remote to the at least a processor 104 and communicative with the at least a processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure at least a processor 104 connect directly, dynamically, and non-hierarchically to as many other computing devices as possible. A "network topology" as used in this disclosure is an arrangement of elements of a communication network. The network may use an immutable sequential listing to securely store the vehicle database 124. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, a vehicle database 124 may include keywords. As used in this disclosure, a "keyword" is an element of word or syntax used to identify and/or match elements to each other. For example, without limitation, the keyword may include "vehicle model" in the instance that a user, such as but not limited to a driver, a car wash employee, and the like, is looking for a model of a vehicle 120. In another non-limiting example, the keyword may include "SUV" in an example where the vehicle 120 is a sport utility vehicle (SUV).

With continued reference to FIG. 1, in some embodiments, a vehicle database 124 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, a memory 108 includes instructions configuring at least processor 104 to receive vehicle data 116 from at least a sensor 112. For the purposes of this disclosure, "vehicle data" is data related to a vehicle. In another embodiment, the at least a processor 104 may receive the vehicle data 116 from a LiDAR system such as but not limited to at least a photodetector and/or timing electronics. In another embodiment, the at least a processor 104 may receive the vehicle data 116 from a user. In another embodiment, the at least a processor 104 may retrieve the vehicle data 116 from a vehicle database 124. In some embodiments, the vehicle data 116 may be stored in the vehicle database 124.

With continued reference to FIG. 1, in an embodiment, vehicle data 116 may include sensor data as described in detail above. For the purposes of this disclosure, "sensor data" is data generated by a sensor. In some embodiments, the sensor data of the vehicle data 116 may be received from a motion sensor, moisture sensor, temperature sensor, or any sensors thereof as disclosed in the entirety of this disclsoure. As a non-limiting example, the sensor data of the vehicle data 116 may include temperature of a hood of a vehicle 120, a movement of the vehicle 120 such as but not limited to the vehicle 120 entering into an entry of a space, the vehicle 120 driving forward or backward in the space, and the like, a moisture level inside of the space, the moisture level of the vehicle 120, and the like.

With continued reference to FIG. 1, in another embodiment, vehicle data 116 may include image data as described in detail above. In some embodiments, the image data of the vehicle data 116 may be received from a camera. As a non-limiting example, the image data of the vehicle data 116 may include an image of a vehicle 120 such as but not limited to a license plate, door, roof, sun roof, window, handle, headlight, side mirror, tire, bumper, trunk, undercarriage, and the like of the vehicle 120, a driver of the vehicle 120, a passenger of the vehicle 120, and the like. As another non-limiting example, the image data may include an image of a license plate of the vehicle 120. As another non-limiting example, the image data of the vehicle data 116 may include a plurality of images of the vehicle 120 from various angles such as but not limited to driver side of the vehicle 120, passenger side of the vehicle 120, front side of the vehicle 120 where the headlight is located, back side of the vehicle 120 where the trunk is located, top side of the vehicle 120 where the roof is located, bottom side of the vehicle 120 where the undercarriage is, 45° angled view, and the like. Persons skilled in the art, upon reviewing the entirety of this disclosure, may appreciate various image data that may be used for the vehicle data 116.

With continued reference to FIG. 1, in some embodiments, at least a processor 104 may analyze image data of vehicle data 116 using optical character recognition (OCR.) In some cases, the at least a processor 104 may be configured to recognize a keyword in an image of a vehicle 120 of the image data using the OCR to find data related to the vehicle 120. As a non-limiting example, the image data may include an image of a driver of the vehicle 120, an image of a license plate of the vehicle 120, stickers attached on the vehicle 120, and the like. As a non-limiting example, the keyword may include a license plate number of the vehicle 120, a model of the vehicle 120, manufactured year, and the like. As used in this disclosure, a "keyword" is an element of word or syntax used to identify and/or match elements to each other. In some cases, the at least a processor 104 may transcribe much or even substantially all image data.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from image data may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of image data. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image data to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 3. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes image data. Since the adaptive classifier may have learned something useful a little too late to recognize characters on the first pass, a second pass may be run over the image data. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in another embodiment, vehicle data 116 may include LiDAR data as described in detail above. For the purposes of this disclosure, "LiDAR data" is data generated by a LiDAR system. In some embodiments, the LiDAR data of the vehicle data 116 may be received from at least a photodetector and timing electronics of the LiDAR system. In an embodiment, the LiDAR data of the vehicle data 116 may include distance data. For the purposes of this disclosure, "distance data" is a distance light traveled to a surface of an object and back. In some embodiments, the distance data may include time-of flight (ToF). In some embodiments, the distance may be calculated using time it takes for the light to travel to the object and back, the ToF. As a non-limiting example, at least a processor 104 may calculate the distance using the following equation: d=c*t/2 where c is the speed of light, d is the distance between the detector and the object or surface being detected, and t is the time spent for the light to travel to the object or surface being detected, then travel back to the detector (the ToF). In another embodiment, the LiDAR data of the vehicle data 116 may include point data. For the purposes of this disclosure, "point data" is data related to a point of reflection of light from a surface of an object that is generated using a LiDAR system. As a non-limiting example, the point data may include a collection of points of reflected lights from a surface of a vehicle 120 using the LiDAR system.

With continued reference to FIG. 1, in another embodiment, vehicle data 116 may include user data. For the purposes of this disclosure, "user data" is data obtained from a user. In an embodiment, the user data of the vehicle data 116 may include user information. For the purposes of this disclosure, "user information" is information related to a user. As a non-limiting example, the user information may include name, gender, date of birth, residency, religion, organ donation, driver history, occupation, family, contact information, emergency contact, billing information such as but not limited to payment method, payment information, payment history, and the like. In another embodiment, the user data of the vehicle data 116 may include user vehicle information. For the purposes of this disclosure, "user vehicle information" is information related to a vehicle obtained from user. As a non-limiting example, the user vehicle information of the vehicle data 116 may include make, manufacture country, model, model version, model year, manufacturer, country of manufacturer, body type, color, coating, steering type, wheel type, tire size, tire type, number of wheels, standard seat number, optional seat number, engine, engine capacity, fuel type, fuel tank capacity, average fuel consumption, maximum permissible weight, vehicle height, vehicle length, vehicle width, vehicle status, such as but not limited to damage status, contamination status, and the like, presence of vehicle accessories, title records, theft records, accident records, insurance records, vehicle ID, interior fabric, license plate number, and the like.

With continued reference to FIG. 1, in some embodiments, a user may input user data using a user device. For the purposes of this disclosure, a "user device" is any device a user uses to input data, where the data may include user data. In an embodiment, the user device may include a personal device. For the purposes of this disclosure, a "personal device" is any device personally owned by a user. As a non-limiting example, the personal device may include a laptop, tablet, mobile phone, smart watch, or things of the like. In some embodiments, the user device may include an interface configured to receive inputs from the user. In some embodiments, the user may have a capability to process, store or transmit any information independently. In another embodiment, the user device may include a shared device. For the purposes of this disclosure, a "shared device" is a device that is designed for use by multiple users. In some embodiments, the shared device may be used by different users at different times. As a non-limiting example, the shared devices may include desktop computers, kiosks, screens, tablets, or the like.

With continued reference to FIG. 1, a memory 108 includes instructions configuring at least processor 104 to generate a graphic model 128 of a vehicle 120 as a function of vehicle data 116. For the purposes of this disclosure, a "graphic model" is a type of visual representation that is computer-generated. In some embodiments, the graphic model 128 may include a three dimensional (3D) model of an exterior of the vehicle 120. For the purposes of this disclosure, an "exterior" of a vehicle is an outer surface of a vehicle. As a non-limiting example, the exterior of the vehicle 120 may include a door, hood, trunk, windows, mirrors, headlights, taillights, grille, and the like. In some embodiments, the 3D model of the graphic model 128 may be generated using a LiDAR system as described above. As a non-limiting example, the 3D model of the vehicle 120 may be generated using point data that is generated by the LiDAR system. In some embodiments, the 3D model of the graphic model 128 may be generated using a machine vision system as described below. As a non-limiting example, the 3D model may be generated using image data. For example and without limitation, the machine vision system may generate the 3D model by using a plurality of images of the vehicle 120 captured from different view. For example and without limitation, after receiving the plurality of images of the vehicle 120 captured from different view, the machine vision system may align the images together by finding common points in each image and aligning them together. Once the images are aligned, the machine vision system may generate a 3D point cloud by identifying common points in the aligned images and creating a point cloud based on those points. For the purposes of this disclosure, a "point cloud" is collection of the shape and structure of an object or scene in 3D space. The point cloud may be then used to create a mesh surface of the vehicle 120 by connecting the points together to create a surface mesh that represents the 3D structure of the object or scene. Then, the mesh surface may be texture-mapped with the original 2D images to create a realistic representation of the vehicle 120.

With continued reference to FIG. 1, a memory 108 includes instructions configuring at least processor 104 to determine a vehicle status 132 of a vehicle 120 as a function of vehicle data 116. For the purposes of this disclosure, a "vehicle status" is a status of a vehicle. In some embodiments, the vehicle status 132 may be stored in the vehicle database 124. In some embodiment, the at least a processor 104 may retrieve the vehicle status 132 from a vehicle database 124.

With continued reference to FIG. 1, in an embodiment, a vehicle status 132 may include a vehicle measurement. For the purposes of this disclosure, a "vehicle measurement" is a measurement of a vehicle obtained from processing vehicle data. As a non-limiting example, the vehicle measurement may include a numerical value of a height, length, width, and the like of a vehicle 120. In an embodiment, the vehicle measurement may be determined using image data. As a non-limiting example, the vehicle measurement may be determined using a machine vision system as described below. For example and without limitation, the at least a processor 104 may use two cameras to capture two slightly different views of the vehicle 120, and then may use the differences in the views to calculate the depth and length of the vehicle 120. For example and without limitation, the at least a processor 104 may determine the vehicle measurement by capturing an image of the vehicle 120 using a camera, calibrating the image by determining a scale factor, where the scale factor can be determined by measuring a known distance in the image and dividing it by an actual distance, using the machine vision system to analyze the image and extract the vehicle 120 by thresholding the image, filtering out noise, and using edge detection algorithms, measuring the length of the vehicle 120 by counting the number of pixels along its edge or by fitting a line to the edge using linear regression and measuring the length of the line, converting the pixel measurement to the actual length by multiplying it by the scale factor. For another example and without limitation, the at least a processor 104 may determine the vehicle measurement using a graphic model 128 of the vehicle 120. As a non-limiting example, the at least a processor 104 may receive multiple images of the vehicle 120 taken from different angles and positions, then may reconstruct a three dimensional (3D) model of the vehicle 120, from which the vehicle measurement can be measured. In another embodiment, the vehicle measurement may be determined using LiDAR data. As a non-limiting example, the at least a processor 104 may determine the length of the vehicle 120 using distance data of the LiDAR data. For example and without limitation, the at least a processor 104 may determine the vehicle measurement by using a laser beam to scan the vehicle 120 and measuring its length by calculating the time it takes for the laser beam to reflect off the vehicle 120 and return to at least a photodetector of a LiDAR system. In another embodiment, the vehicle measurement may be determined using user data. As a non-limiting example, if the user data includes user vehicle information that the length of the vehicle 120 is 14.7 ft, then the at least a processor 104 may determine that the vehicle measurement is 14.7 ft.

With continued reference to FIG. 1, in another embodiment, a vehicle status 132 may include a vehicle contamination status. For the purposes of this disclosure, a "vehicle contamination status" is a state of a vehicle being contaminated with a foreign substance. As a non-limiting example, the vehicle contamination status may include which part of the vehicle 120 is contaminated, how much the vehicle 120 is contaminated, with what kind of foreign substance the vehicle 120 is contaminated, and the like. For example and without limitation, the vehicle contamination status may include a bumper of the vehicle 120, a headlight of the vehicle 120, a window of the vehicle 120, a trunk of the vehicle 120, a sun roof of the vehicle 120, and the like to indicate which part of the vehicle 120 is contaminated. For another example and without limitation, the vehicle contamination status may include low, medium, high, and the like to indicate how much the vehicle 120 is contaminated. For another example and without limitation, the vehicle contamination status may include a level indicated with a numerical value, such as but not limited to level 0, level 1, level 2, level 3, and the like to indicate how much the vehicle 120 is contaminated. Foreign substances may include, as non-limiting examples, dust, leaves, mud, paint, oil, dirt, excrement, bugs, sap, and the like. For another example and without limitation, the vehicle contamination status may include dust, leaves, mud, paint, oil, and the like to indicate with what kind of foreign factor the vehicle 120 is contaminated. In an embodiment, the vehicle contamination may be determined using image data. As a non-limiting example, the at least a processor 104 may analyze an image of the vehicle using a machine vision system as described in the entirety of this disclosure to determine the vehicle contamination status. In another embodiment, the vehicle contamination status may be determined using LiDAR data. As a non-limiting example, the at least a processor 104 may determine the vehicle measurement by using a laser beam to scan the vehicle 120, measuring its length by calculating the time it takes for the laser beam to reflect off the vehicle 120 and return to at least a photodetector of a LiDAR system, determining if there is any contamination in the vehicle 120. In another embodiment, the vehicle contamination status may be determined using user data. As a non-limiting example, if the user data includes user vehicle information that the vehicle 120 includes a contamination status of a bumper of the vehicle 120 being contaminated with mud, then the at least a processor 104 may determine that the vehicle contamination status includes the contaminated bumper of the vehicle 120 with the mud.

With continued reference to FIG. 1, in another embodiment, a vehicle status 132 may include a vehicle gate status. For the purposes of this disclosure, a "vehicle gate status" is a state of a gate of a vehicle, including whether the gate is open or closed. For the purposes of this disclosure, a "gate" of a vehicle is a movable barrier of a vehicle. As a non-limiting example, the gate may include windows, doors, sun roof, trunk, hood, and the like. In some embodiments, the vehicle gate status of the vehicle status 132 may include whether the gate of the vehicle 120 is opened or not. As a non-limiting example, the vehicle gate status may include 'opened window,' 'opened door,' 'opened sun roof,' 'opened trunk,' 'opened hood,' 'closed window,' 'closed door,' 'closed sun roof,' 'closed trunk,' 'closed hood,' and the like. In some embodiments, the vehicle gate status may be determined as a function of image data. As a non-limiting example, at least a processor 104 may determine that the gate is opened by analyzing the image data using a machine vision process. The machine vision process disclosed herein is further described below. In some embodiments, the vehicle gate status may be determined as a function of LiDAR data. As a non-limiting example, the at least a processor 104 may determine that the gate is opened using distance data of the LiDAR data. For example and without limitation, if the time-of-flight (ToF) is longer than a gate threshold, then the at least a processor 104 may determine that the gate is open. For example and without limitation, if the time-of-flight is equal or shorter than the gate threshold, then the at least a processor 104 may determine that the gate is closed. For the purposes of this disclosure, a "gate threshold" is a predetermined value of time-of-flight to a gate.

With continued reference to FIG. 1, in another embodiment, a vehicle status 132 may include a vehicle damage status. For the purposes of this disclosure, a "vehicle damage status" is a damage status of a vehicle. In some embodiments, at least a processor 104 may determine if there is a damage on any parts of a vehicle 120. As a non-limiting example, the vehicle damage status may include any damage present on any parts of the vehicle 120. For example and without limitation, the vehicle damage status may include scratches, dents, cracks, paint damages, rusts, and the like. In an embodiment, the vehicle damage status may be determined as a function of image data. As a non-limiting example, the at least a processor 104 may determine that there is the damage on the vehicle 120 using a machine vision system. The machine vision process disclosed herein is further described below. In another embodiment, the vehicle damage status may be determined as a function of LiDAR data. As a non-limiting example, the at least a processor 104 may determine that there is the damage on the vehicle 120 using distance data of the LiDAR data. For example and without limitation, the at least a processor 104 may determine the vehicle damage status by using a laser beam to scan the vehicle 120, measuring its distance by calculating the time it takes for the laser beam to reflect off the vehicle 120 and return to at least a photodetector of a LiDAR system, determining if there is any damage in the vehicle 120. For example and without limitation, when the LiDAR system is scanning a side portion of the vehicle 120 from a headlight to a tail light of the vehicle 120, if the distance calculated from the LiDAR system includes a sudden increased value of the distance at a door of the vehicle 120 close to the headlight, it may indicate that the door of the vehicle 120 includes a dent. In some embodiments, places where there are sudden jumps or discontinuities in the LiDAR data that quickly return to normal may indicate the presence of a scratch. In another embodiment, the vehicle damage status may be determined using user data. As a non-limiting example, if the user data includes user vehicle information that the vehicle 120 includes a scratch on a bumper and a dent on a passenger side of a door, then the at least a processor 104 may determine that the vehicle contamination status includes the scratch on the bumper and the dent on the passenger side of the door.

With continued reference to FIG. 1, in some embodiments, a vehicle status 132 may include vehicle information. For the purposes of this disclosure, a "vehicle information" is information related to a vehicle obtained from vehicle data. As a non-limiting example, the vehicle information may include make, manufacture country, model, model version, model year, manufacturer, country of manufacturer, body type, color, coating, steering type, wheel type, tire type, number of wheels, standard seat number, optional seat number, engine, engine capacity, fuel type, fuel tank capacity, average fuel consumption, maximum permissible weight, presence of vehicle accessories, title records, theft records, accident records, insurance records, vehicle ID, interior fabric, license plate number, and the like. In an embodiment, the vehicle information may be determined using image data. As a non-limiting example, the at least a processor 104 may receive an image of a license plate, analyze the image of the license plate using a machine vision system as disclosed below to find a license number of the vehicle 120 and obtain the vehicle information related to the license number of the vehicle 120 from a vehicle database 124. As another non-limiting example, the at least a processor 104 may receive an image of the vehicle 120 and determine the vehicle information such as but not limited to model, model version, manufacture country, and the like using the machine vision system. Additional disclosure related to analyzing image data to determine the vehicle information may be found in U.S. patent application Ser. No. 18/195,597, filed on May 10, 2023, entitled "AN APPARATUS AND METHOD FOR GENERATING A VEHICLE MAINTENANCE ACTIVITY,", the entirety of which is incorporated as a reference. In another embodiment, the vehicle information may be determined using LiDAR data. As a non-limiting example, the at least a processor 104 may determine a body type of the vehicle 120 using the LiDAR data. In another embodiment, the vehicle information may be determined using user data. As a non-limiting example, if the user data includes user vehicle information that the vehicle 120 includes the manufacture country of the vehicle 120 is South Korea, then the at least a processor 104 may determine the vehicle information of the manufacture country of the vehicle 120 is South Korea. Additional disclosure related to the vehicle information may be found in U.S. patent application Ser. No. 18/195,537, filed on May 10, 2023, entitled "APPARATUS AND METHOD FOR AUTOMATIC LICENSE PLATE RECOGNITION OF A VEHICLE,", the entirety of which is incorporated as reference.

With continued reference to FIG. 1, in some embodiments, an apparatus 100 may include a machine vision system. For the purposes of this disclosure, a "machine vision system" is a type of technology that enables a computing device to inspect, evaluate, and identify still or moving images. In some embodiments, the machine vision system may use vehicle data 116 to make a determination about a scene, space, and/or object. For example, in some cases the machine vision system may be used for world modeling or registration of objects within a space. In some cases, registration may include image processing, such as without limitation object recognition, feature detection, edge/corner detection, and the like. Non-limiting example of the object recognition may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). The machine vision process may detect motion, for example by way of frame differencing algorithms. The machine vision process may detect markers, for example blob detection, object detection, face detection, and the like. In some cases, the machine vision process may perform eye tracking (i.e., gaze estimation). In some cases, the machine vision process may perform person detection, for example by way of a trained machine learning model. In some cases, a machine vision process may perform motion detection (e.g., camera motion and/or object motion), for example by way of optical flow detection. In some cases, the machine vision process may perform code (e.g., barcode) detection and decoding. In some cases, the machine vision process may additionally perform image capture and/or video recording.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, determining a vehicle status 132 may include identifying a shape of a vehicle 120 using an image recognition algorithm. Image recognition algorithm may include an edge-detection algorithm, which may detect one or more shapes defined by edges. An "edge detection algorithm," as used in this disclosure, is a mathematical method that identifies points in a digital image at which the image brightness changes sharply and/or has discontinuities. In an embodiment, such points may be organized into straight and/or curved line segments, which may be referred to as "edges." Edge detection may be performed using any suitable edge detection algorithm, including without limitation Canny edge detection, Sobel operator edge detection, Prewitt operator edge detection, Laplacian operator edge detection, and/or Differential edge detection. Edge detection may include phase congruency-based edge detection, which finds all locations of an image where all sinusoids in the frequency domain, for instance as generated using a Fourier decomposition, may have matching phases which may indicate a location of an edge.

With continued reference to FIG. 1, Alternatively or additionally, identifying a shape of a vehicle 120 may include classifying the shape of the vehicle 120 to a label of the vehicle 120 using an image classifier; the image classifier may be trained using a plurality of images of the vehicle 120. The image classifier may be configured to determine which of a plurality of edge-detected shapes is closest to an attribute set of the vehicle 120 as determined by training using training data and selecting the determined shape as the vehicle 120. As a non-limiting example, the image classifier may be trained with image training data that correlates the plurality of images of vehicle 120 to a label of the vehicle status 132. For example and without limitation, the image training data may correlate a plurality of images of the vehicle 120 manufactured in South Korea to a label of 'made in South Korea.' For another example and without limitation, the image training data may correlate a plurality of images of the vehicle 120 that is a shape of SUV to a label of 'SUV.' Alternatively, identification of the vehicle status 132 may be performed without using computer vision and/or classification; for instance, identifying the vehicle status 132 may further include receiving, from a user, an identification of the vehicle status 132 in an image of the vehicle 120. The user identification may include any user data described above.

With continued reference to FIG. 1, a memory 108 includes instructions configuring at least a processor 104 to classify a vehicle status 132 and vehicle data 116 into one or more vehicle status groups 136. For the purposes of this disclosure, a "vehicle status group" is a set of associative vehicle status and vehicle data. As a non-limiting example, the one or more vehicle status groups 136 may include a vehicle measurement group, vehicle gate status group, vehicle contamination status group, vehicle damage status group, vehicle information group, image data group, sensor data group, distance data group of a LiDAR data group, point data group of the LiDAR data group, user information group of a user data group, user vehicle information group of the user data group, and the like. For example and without limitation, the vehicle measurement group may include height group, length group, width group, and the like. For another example and without limitation, the vehicle gate status group may include an opened window group, closed window group, opened sunroof group, closed sunroof group, opened door group, closed door group, opened trunk group, closed trunk group, opened hood group, closed hood group, and the like. For example and without limitation, the vehicle contamination status group may include contaminated part group, contaminated level group, contamination factor group, and the like. For example and without limitation, the vehicle information group may include make group, manufacture country group, model group, model version group, model year group, manufacturer group, country of manufacturer group, body type group, color group, coating group, steering type group, wheel type group, tire type group, number of wheels group, standard seat number group, optional seat number group, engine group, engine capacity group, fuel type group, fuel tank capacity group, average fuel consumption group, maximum permissible weight group, presence of vehicle accessories group, title records group, theft records group, accident records group, insurance records group, vehicle ID group, interior fabric group, license plate number group, and the like. For another example and without limitation, the vehicle damage status group may include a scratch group, dent group, bumper group, trunk group, door group, window group, ceiling group, headlight group, and the like. In some embodiments, the one or more vehicle status groups 136 may be stored in a vehicle database 124. In some embodiments, the one or more vehicle status groups 136 may be retrieved from the vehicle database 124.

With continued reference to FIG. 1, in some embodiments, a vehicle status 132 and vehicle data 116 may be classified to one or more vehicle status groups 136 using a group classifier 144. As used in this disclosure, a "group classifier" is a machine-learning model, such as a mathematical model, neural net, or program generated by a machine learning algorithm known as a "classification algorithm," that sorts inputs into categories or bins of data, outputting a plurality of groups associated therewith. The group classifier 144 disclosed herein may be consistent with a classifier disclosed with respect to FIG. 3. In some embodiments, a group classifier 144 may be trained with group training data correlating the vehicle data and the vehicle status 132 to one or more vehicle status groups 136. For the purposes of this disclosure, "training data" is data containing correlations that a machine-learning process may use to model relationships between two or more categories of data elements. The training data disclosed herein is further disclosed with respect to FIG. 3. In some embodiments, the group training data may be stored in a vehicle database 124. In some embodiments, the group training data may be received from one or more users, vehicle database 124, external computing devices, and/or previous iterations of processing. As a non-limiting example, the group training data may include instructions from a user, who may be an expert user, a past user in embodiments disclosed herein, or the like, which may be stored in memory and/or stored in the vehicle database 124, where the instructions may include labeling of training examples.

With continued reference to FIG. 1, in an embodiment, a group classifier 144 may be trained with group training data that correlates vehicle data 116 into one or more vehicle status groups 136. As a non-limiting example, the group training data may correlate sensor data to a sensor data group. For example and without limitation, the group training data may correlate a movement of a vehicle 120, entering into a space, to the sensor data group. As a non-limiting example, the group training data may correlate image data to an image data group. For example and without limitation, the group training data may correlate an image of the vehicle 120 to the image data group. As a non-limiting example, the group training data may correlate distance data of LiDAR data to a distance data group of a LiDAR data group. For example and without limitation, the group training data may correlate ToF data to the distance data group of the LiDAR data group. As a non-limiting example, the group training data may correlate point data of LiDAR data to a point data group of a LiDAR data group. For example and without limitation, the group training data may correlate collection of points generated from a LiDAR system to the point data of the LiDAR data group. As a non-limiting example, the group training data may correlate user information of user data to a user information group of a user data group. For example and without limitation, the group training data may correlate family information received from a user to the user information group of the user data group. As a non-limiting example, the group training data may correlate user vehicle information of user data to a user vehicle information group of the user data group. For example and without limitation, the group training data may correlate model of the vehicle 120 received from the user to the user vehicle information group.

With continued reference to FIG. 1, a group classifier 144 may be trained with group training data that correlates a vehicle status 132 into one or more vehicle status groups 136. As a non-limiting example, the group training data may correlate vehicle measurement to a vehicle measurement group. For example and without limitation, the group training data may correlate a height of a vehicle 120 to a height group of the vehicle measurement group. As a non-limiting example, the group training data may correlate vehicle contamination status to a vehicle contamination status group. For example and without limitation, the group training data may correlate a bumper of the vehicle 120 being contaminated with mud to a contaminated part group and a contamination factor group of the vehicle contamination status group. As a non-limiting example, the group training data may correlate vehicle gate status to a vehicle gate status group. For example and without limitation, the group training data may correlate an opened window of the vehicle to an opened window group of the vehicle gate status group. As a non-limiting example, the group training data may correlate vehicle damage status to a vehicle damage status group. For example and without limitation, the group training data may correlate a scratch on the bumper to a scratch group and a bumper group of the vehicle damage status group. As a non-limiting example, the group training data may correlate vehicle information to a vehicle information group. For example and without limitation, the group training data may correlate a license plate number determined from vehicle data 116 to a license plate number group of the vehicle information group.

With continued reference to FIG. 1, in some embodiments, a vehicle status 132 and vehicle data 116 may be classified into one or more vehicle status groups 136 using a group lookup table. A "lookup table," for the purposes of this disclosure, is an array of data that maps input values to output values. A lookup table may be used to replace a runtime computation with an array indexing operation. In an embodiment, the lookup table may include interpolation. For the purposes of this disclosure, an "interpolation" refers to a process for estimating values that lie between the range of known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, in an embodiment, a group lookup table may 'lookup' vehicle data 116 to find corresponding one or more vehicle status groups 136. As a non-limiting example, the group lookup table may correlate sensor data to a sensor data group. For example and without limitation, the group lookup table may correlate a movement of a vehicle 120, entering into a space, to the sensor data group. As a non-limiting example, the group lookup table may correlate image data to an image data group. For example and without limitation, the group lookup table may correlate an image of the vehicle 120 to the image data group. As a non-limiting example, the group lookup table may correlate distance data of LiDAR data to a distance data group of a LiDAR data group. For example and without limitation, the group lookup table may correlate ToF data to the distance data group of the LiDAR data group. As a non-limiting example, the group lookup table may correlate point data of LiDAR data to a point data group of a LiDAR data group. For example and without limitation, the group lookup table may correlate collection of points generated from a LiDAR system to the point data of the LiDAR data group. As a non-limiting example, the group lookup table may correlate user information of user data to a user information group of a user data group. For example and without limitation, the group lookup table may correlate family information received from a user to the user information group of the user data group. As a non-limiting example, the group lookup table may correlate user vehicle information of user data to a user vehicle information group of the user data group. For example and without limitation, the group lookup table may correlate model of the vehicle 120 received from the user to the user vehicle information group.

With continued reference to FIG. 1, a group lookup table may 'lookup' vehicle status 132 to find corresponding one or more vehicle status groups 136. As a non-limiting example, the group lookup table may correlate vehicle measurement to a vehicle measurement group. For example and without limitation, the group lookup table may correlate a height of a vehicle 120 to a height group of the vehicle measurement group. As a non-limiting example, the group lookup table may correlate a vehicle contamination status to a vehicle contamination status group. For example and without limitation, the group lookup table may correlate a bumper of the vehicle 120 being contaminated with mud to a contaminated part group and contamination factor group of the vehicle contamination status group. As a non-limiting example, the group lookup table may correlate vehicle gate status to a vehicle gate status group. For example and without limitation, the group lookup table may correlate an opened window of the vehicle to an opened window group of the vehicle gate status group. As a non-limiting example, the group lookup table may correlate vehicle damage status to a vehicle damage status group. For example and without limitation, the group lookup table may correlate a scratch on the bumper to a scratch group and a bumper group of the vehicle damage status group. As a non-limiting example, the group lookup table may correlate vehicle information to a vehicle information group. For example and without limitation, the group lookup table may correlate a license plate number determined from vehicle data 116 to a license plate number group of the vehicle information group.

With continued reference to FIG. 1, a memory 108 includes instructions configuring at least processor 104 to generate a vehicle report 140 as a function of one or more vehicle status groups 136. For the purposes of this disclosure, a "vehicle report" is a report that includes information related to a vehicle that is generated and/or calculated for a user. In some embodiments, the vehicle report 140 may be stored in vehicle database 124. In some embodiments, the vehicle report 140 may be retrieved from the vehicle database 124. In some embodiments, the vehicle report 140 may include a form of a text, an audio, an image, a graph, a table, a video, and the like. In some embodiments, the vehicle report 140 may include a vehicle measurement report. As a non-limiting example, the at least a processor 104 may generate the vehicle measurement report as a function of one or more vehicle measurement group of the one or more vehicle status groups 136. As another non-limiting example, the vehicle measurement report may include a height, width, length of a vehicle 120. As another non-limiting example, the vehicle measurement report may include vehicle information of user data. For example and without limitation, the vehicle measurement report may include the height, width and length of the vehicle 120 received from the user data. In some embodiments, the vehicle report 140 may include a vehicle status group. As a non-limiting example, the at least a processor 104 may generate the vehicle status report as function of a vehicle damage status group, vehicle contamination status group and/or vehicle gate status group. As another non-limiting example, the vehicle status report may include vehicle damage status, vehicle contamination status, vehicle gate status, and the like. As another non-limiting example, the vehicle status report may include user vehicle information of user data. For example and without limitation, the vehicle status report may include a vehicle status of the user data and vehicle contamination status of the user data. In some embodiments, the vehicle report 140 may include vehicle information report. As a non-limiting example, the at least a processor 104 may generate the vehicle information report as a function of a vehicle information group. As another non-limiting example, the vehicle information report may include vehicle information of the vehicle 120 determined from vehicle data 116. As another non-limiting example, the vehicle status report may include the user vehicle information of the user data. For example and without limitation, the vehicle status report may include a vehicle status of the user data and vehicle contamination status of the user data. For example and without limitation, the vehicle information report may include make, manufacture country, model, model version, model year, manufacturer, country of manufacturer, body type, color, coating, steering type, wheel type, tire type, number of wheels, standard seat number, optional seat number, engine, engine capacity, fuel type, fuel tank capacity, average fuel consumption, maximum permissible weight, presence of vehicle accessories, title records, theft records, accident records, insurance records, vehicle ID, interior fabric, license plate number, and the like.

With continued reference to FIG. 1, in an embodiment, a vehicle report 140 may be read-only. In another embodiment, the vehicle report 140 may be writable. In some embodiments, the writable load report may require authentication; for instance without limitation, the writable load report may be writable only given a unique code indicating that the device that will be modifying the vehicle report 140 is authorized. For the purposes of this disclosure, a "unique code" is an identifier that is unique for an object among others. As a non-limiting example, the unique code may include a universal product code (UPC), a barcode, radio-frequency identification (RFID,) cryptographic hashes, primary key, a unique sequencing of alpha-numeric symbols, QR code, or anything of the like. In some embodiments, the vehicle report 140 may include any combination of the above; for instance without limitation, the vehicle report 140 may include a read-only section. For example without limitation, the vehicle report 140 may include a writable section with limited access. For the purposes of this disclosure, "writable section" is a section of a load report that is writable. In some embodiments, the vehicle report 140 may include a writable section with general access, to which any user may be able to input data. The vehicle report 140 may include the read-only section and the generally writable section, or the limited access writable section and the generally writable section, or the read-only section and the limited access section. The limited access section may be limited to users of the apparatus 100, or in other words may be generally writable, but only to users of the apparatus 100, who may have the unique code; the users may alternatively be granted the unique code by the apparatus 100 to update data only when authorized by the apparatus 100, and otherwise be unable to update the vehicle report 140. In some embodiments, a unique code may allow an access to a particular portion of a vehicle report 140. In some embodiments, preventing users from being able to write over a vehicle report 140 enables the vehicle report 140 to be free from intentional or unintentional corruption or inaccuracy, and enables the apparatus 100 to ensure that certain information is always available to users. In some embodiments, writable sections enable the apparatus 100 itself or users of the apparatus 100 to correct, augment, or update information of the vehicle report 140.

With continued reference to FIG. 1, a memory 108 may include instructions further configuring at least processor 104 to generate a wash command 148 as a function of vehicle report 140. For the purposes of this disclosure, a "wash command" is a command configured to enable the washing of a vehicle. As a non-limiting example, the wash command may include 'spray water,' 'spray soap,' 'pre-soak,' 'rinse,' 'dry,' 'wipe,' 'wax,' and the like. As a non-limiting example, the wash command may include 'spray water,' 'spray soap,' 'pre-soak,' 'rinse,' 'dry,' 'wipe,' 'wax,' 'stop,' 'do not wash,' and the like. In an embodiment, the at least a processor 104 may generate the wash command 148 as a function of a vehicle measurement report. As a non-limiting example, when the vehicle measurement report includes length, height and width of a vehicle 120, then the wash command 148 may include 'spray water and soap for the length, height and width of the vehicle 120.' In another embodiment, the at least a processor 104 may generate the wash command 148 as a function of a vehicle status report. As a non-limiting example, when the vehicle status report includes a vehicle contamination status of the vehicle 120, then the wash command 148 may include 'rinse twice on a contaminated part of the vehicle 120.' As another non-limiting example, when the vehicle status report includes a vehicle gate status of the vehicle 120 that a sun roof of the vehicle 120 is opened, then the wash command may include 'do not start washing.' As another non-limiting example, when the vehicle status report includes a vehicle gate status of the vehicle 120 is "open," then the wash command may include 'do not start washing.' In another embodiment, the at least a processor 104 may generate the wash command 148 as a function of a vehicle information report. As a non-limiting example, when the vehicle information report includes coating of the vehicle 120, the wash command 148 may include specific type of wax for the vehicle 120. Additional disclosure related to wash command may be found in U.S. patent application Ser. No. 18/195,633, filed on May 10, 2023, entitled as "METHODS AND APPARATUSES FOR VEHICLE DIMENSIONING IN A CAR WASH,", the entirety of which is incorporated as a reference.

Figure 2A:
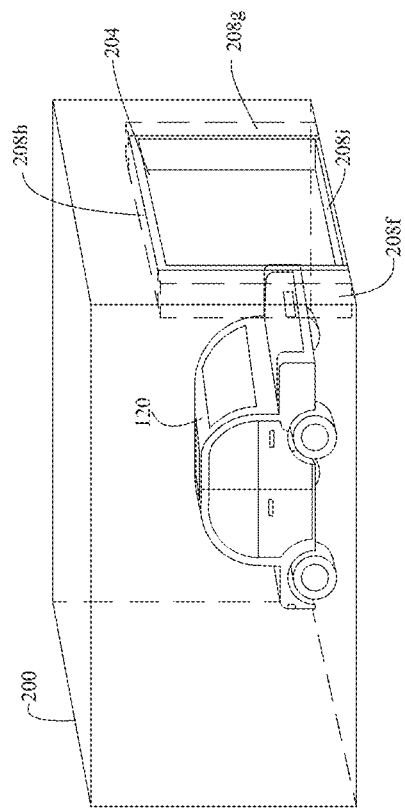
FIGS. 2A-B illustrate an exemplary embodiment of a space for vehicle profiling.
Figure 2B:
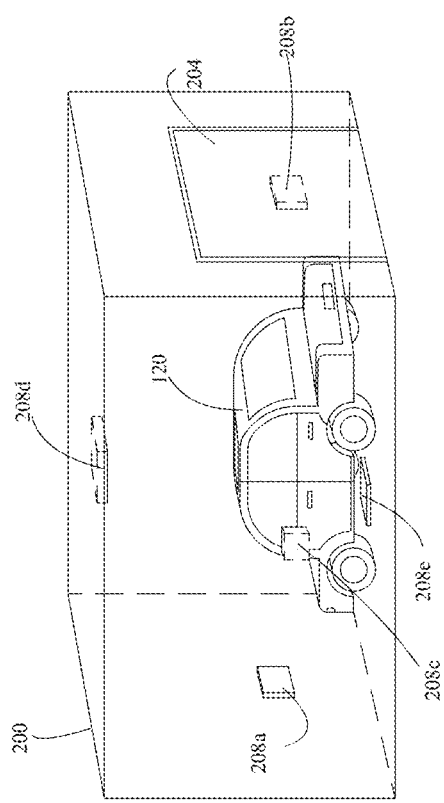

Referring now to FIG. 2A-B, illustrations of exemplary embodiments of a space 200 for vehicle profiling are shown. In some embodiments, the space 200 may include a vehicle 120. In some embodiments, a vehicle 120 may include any types of car, truck, bus, motorcycle, bicycle, watercraft, aircraft, and the like. In some embodiments, the space may include a self-service car wash, automatic car wash, touchless carwash, a garage, a car wash booth, a room, and the like. In some embodiments, the space may include an entrance 204. For the purposes of this disclosure, an "entrance" is an opening that allows access to a place. As a non-limiting example, the entrance 204 may include a door as shown in FIG. 2A. For example and without limitation, the door may include a sliding door, roll-up door, and the like. As another non-limiting example, the entrance 204 may not include any door as show in FIG. 2B. In some embodiments, the space 200 may include at least a sensor 208a-i. As shown in FIG. 2A, in some embodiments, the space 200 may include the at least a sensor 208a-d on each sides of walls of the space 200. In some embodiments, the space 200 may include the at least a sensor 208e on the entrance 204. As a non-limiting example, the at least a sensor 208a may be in front of the vehicle 120. As another non-limiting example, the at least a sensor 208b may be behind the vehicle 120. As another non-limiting example, the at least a sensor 208c may be on a driver side of the vehicle 120. As another non-limiting example, the at least a sensor may be on a passenger side of the vehicle 120 (not shown in FIG. 2A). As another non-limiting example, the at least a sensor 208d may be on top of the vehicle 120. As another non-limiting example, the at least a sensor 208e may be below the vehicle 120. This is so, that the at least a sensor 208a-d may detect vehicle data 116 as the vehicle 120 is in the space 200. In some embodiments, the at least a sensor 208f-I may be at the entrance 204 of the space 200. As a non-limiting example, the at least a sensor 208f-i may be on left, right, top, bottom of the entrance 204. This is so, that the at least a sensor 208f-i may detect the vehicle data 116 as the vehicle 120 moves into and/or moves out of the space 200.

Figure 3:
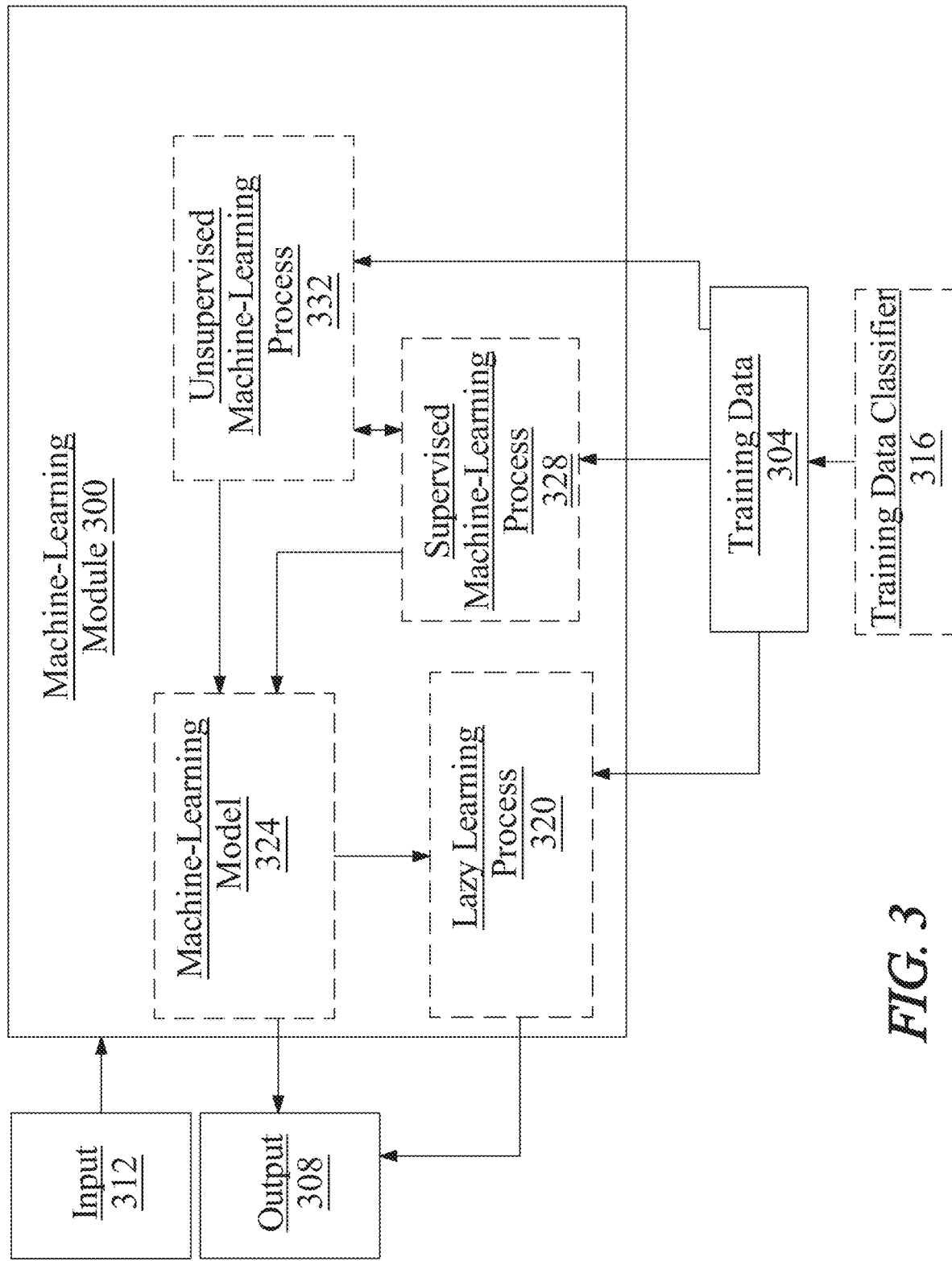
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

With continued reference to FIG. 3, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and with continued reference to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

With continued reference to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a process whereby a computing device and/or any module and/or component operating thereon derives a classifier from training data 304. Classification may be performed using, without limitation, linear classifiers such as without limitation logistic regression and/orIe Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With continued reference to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network including an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 3, machine-learning algorithms may include at least a supervised machine-learning process 328. At least a supervised machine-learning process 328, as defined herein, include algorithms that receive a training set relating several inputs to outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With continued reference to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of one divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

With continued reference to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 4:
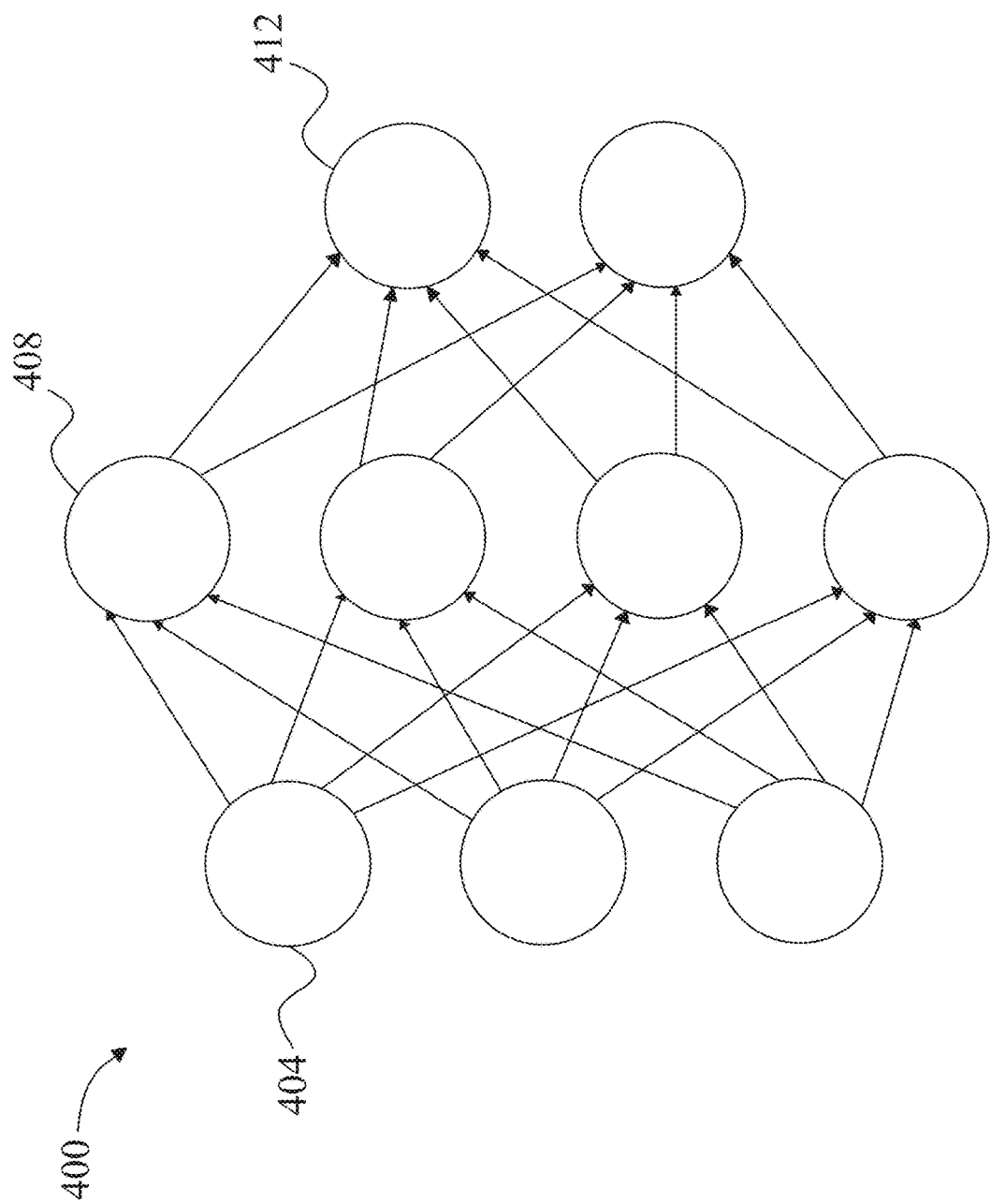
FIG. 4 is a diagram of an exemplary nodal network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
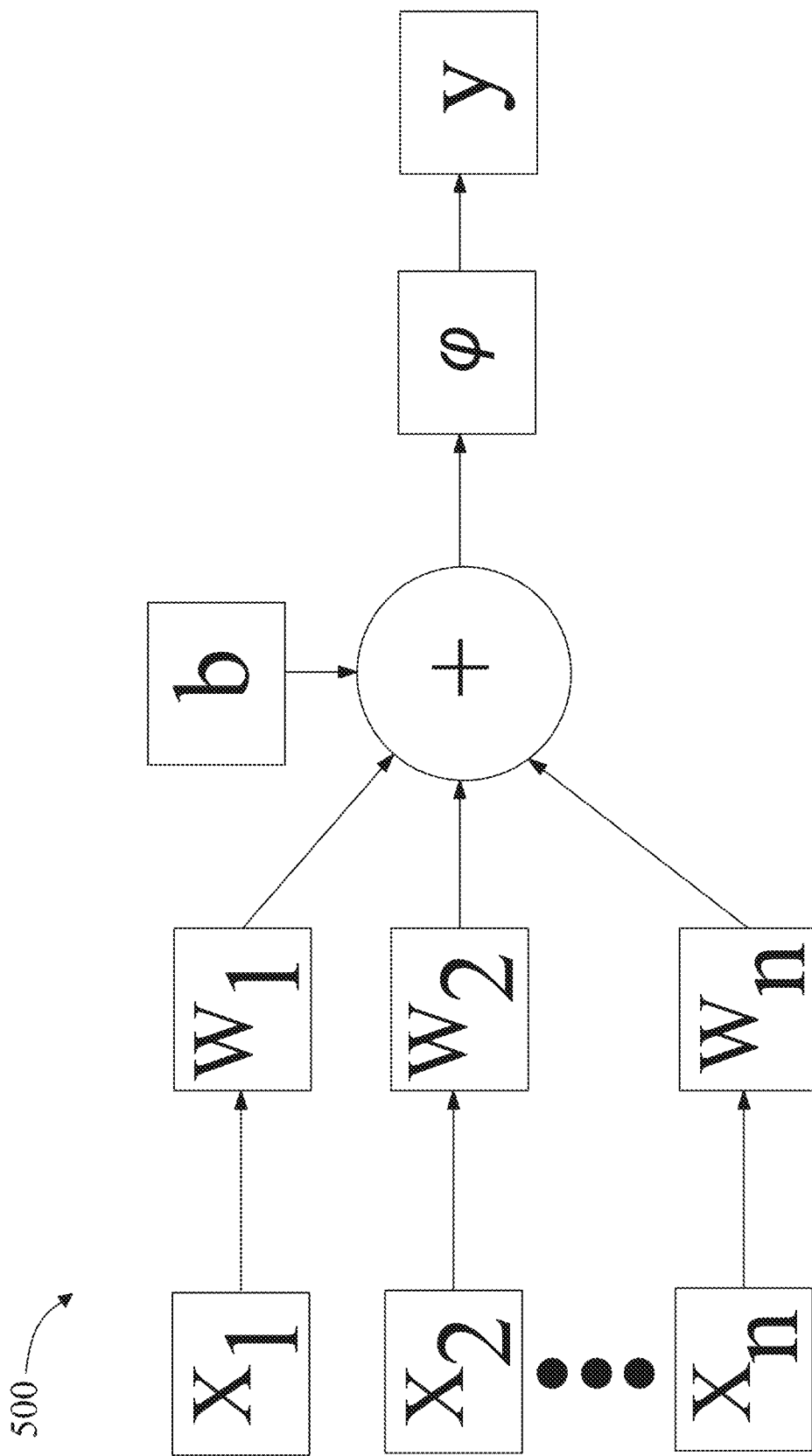
FIG. 5 is a block diagram of an exemplary node.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $z_i$. Additionally or alternatively, a bias b may be added to the weighted sum of the inputs such that an offset is added to each unit in the neural network layer that is independent of the input to the layer. The weighted sum may thIn be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
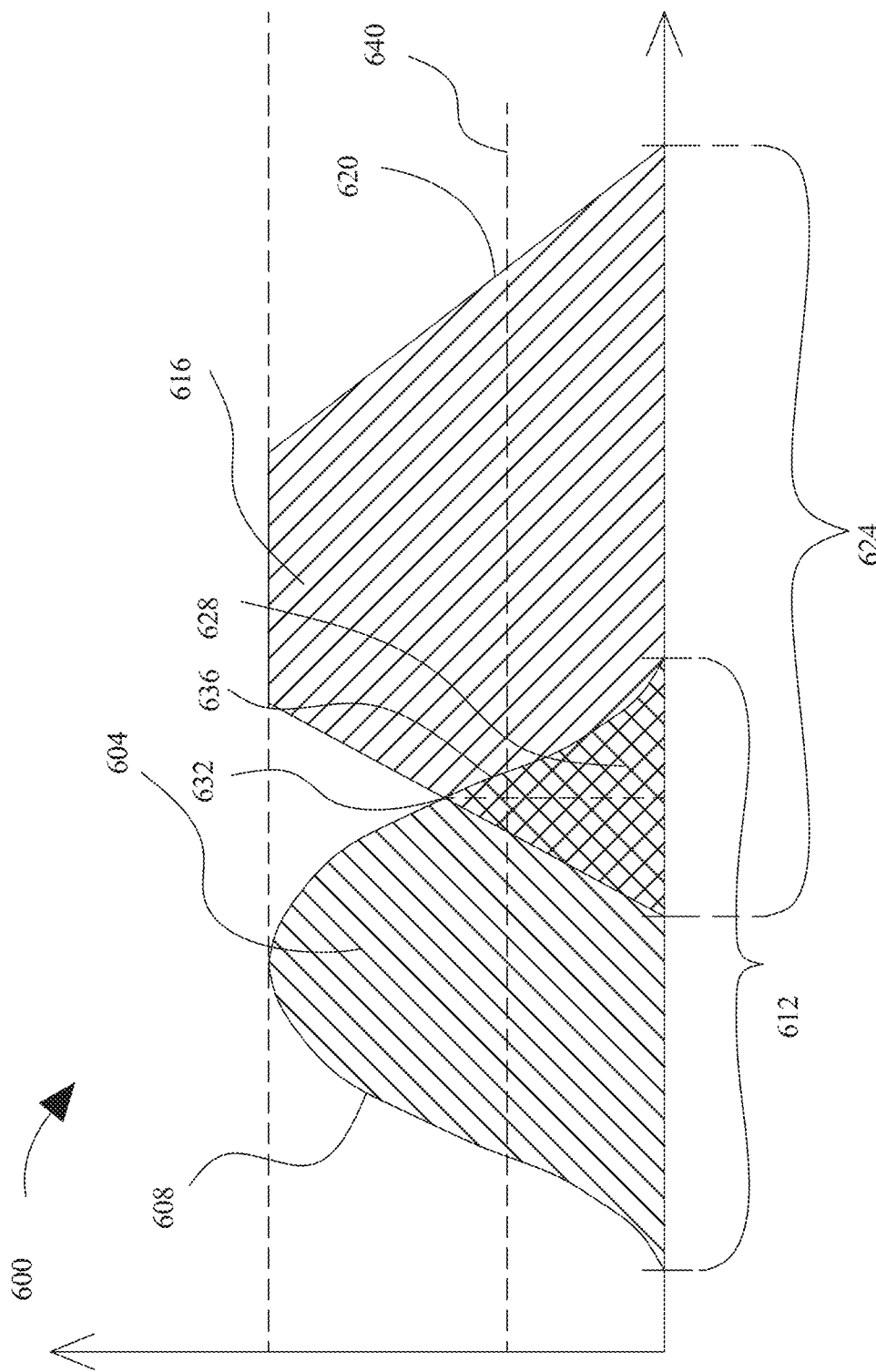
FIG. 6 is a block diagram of a fuzzy set system.

Referring now to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{3}\left(\frac{x-c}{\sigma}\right)^3}$$

and a bell membership function may be defined as:

$$y(x, a, b, c,) = \left[1 + \left|\frac{x-c}{a}\right|^{3b}\right]^{-1}$$

Persons skilled in the art, upon reviewing the entirety of this disclosure, will be aware of various alternative or additional membership functions that may be used consistently with this disclosure.

With continued reference to FIG. 6, first fuzzy set 604 may represent any value or combination of values as described above, including output from one or more machine-learning models. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or an assessed vehicle status groups, alone or in combination. Alternatively or additionally, each threshold may be tuned by a machine-learning and/or statistical process, for instance and without limitation as described in further detail below.

With continued reference to FIG. 6, in an embodiment, vehicle data and/or vehicle status and/or user interest data may be compared to multiple vehicle status groups fuzzy sets. For instance, user profile may be represented by a fuzzy set that is compared to each of the multiple vehicle status group fuzzy sets; and a degree of overlap exceeding a threshold between the vehicle status fuzzy set and any of the multiple vehicle status groups fuzzy sets may cause processor to rank vehicle status groups as a function of the vehicle data and/or vehicle status. For instance, in one embodiment there may be two vehicle status group fuzzy sets, representing respectively a first vehicle status group and a second vehicle status group. First vehicle status group may have a first fuzzy set; and Second vehicle status group may have a second fuzzy set. Processor 104, for example, may compare a vehicle data and/or vehicle status fuzzy set with each of the first and second vehicle status group fuzzy sets, as described above, and classify a user profile to either, both, or neither of the first and second vehicle status groups. Machine-learning methods as described throughout may, in a non-limiting example, generate coefficients used in fuzzy set equations as described above, such as without limitation x, c, and σ of a Gaussian set as described above, as outputs of machine-learning methods. Likewise, vehicle data and/or vehicle status may be used indirectly to determine a fuzzy set, as vehicle data and/or vehicle status fuzzy set may be derived from outputs of one or more machine-learning models that take the vehicle data and/or vehicle status such as products and/or data directly or indirectly as inputs.

With continued reference to FIG. 6, a computing device may use a logic comparison program, such as, but not limited to, a fuzzy logic model to determine a correlation between a plurality of vehicle data and/or vehicle status and a plurality of vehicle status groups. A correlation between vehicle data and/or vehicle status and vehicle status groups may include, but is not limited to, irrelevant, poor, average, high, and the like; each such designation may be represented as a value for a linguistic variable representing correlation, or in other words, a fuzzy set as described above that corresponds to a degree of positive correlations as calculated using any statistical, machine-learning, or other method that may occur to a person skilled in the art upon reviewing the entirety of this disclosure. In other words, a given element of vehicle data and/or vehicle status object may have a first non-zero value for membership in a first linguistic variable value such as a high correlation and a second non-zero value for membership in a second linguistic variable value such as average correlation. In some embodiments, determining a correlation may include using a linear regression model. A linear regression model may include a machine learning model. A linear regression model may be trained using a machine learning process. A linear regression model may map statistics such as, but not limited to, degree of similarity with respect to the type of vehicle data and/or vehicle status and vehicle status groups. In some embodiments, determining a correlation between vehicle data and/or vehicle status and vehicle status groups may include using a classification model. The classification model may be configured to input collected data and cluster data to a centroid based on, but not limited to, frequency of appearance, linguistic indicators of correlation, and the like.

Centroids may include scores assigned to them such that level of correlation of vehicle data and/or vehicle status and vehicle status groups may each be assigned a score. In some embodiments, the classification model may include a K-means clustering model. In some embodiments, the classification model may include a particle swarm optimization model. In some embodiments, determining the classification model may include using a fuzzy inference engine. A fuzzy inference engine may be configured to map one or more elements of vehicle data and/or vehicle status and vehicle status group data using fuzzy logic. In some embodiments, vehicle data and/or vehicle status and vehicle status groups may be arranged by a logic comparison program into various levels of correlation arrangements. A "correlation arrangement" as used in this disclosure is any grouping of objects and/or data based on degree of match based on vehicle status group assessment. This step may be implemented as described above in FIGS. 1-6. Membership function coefficients and/or constants as described above may be tuned according to classification and/or clustering algorithms. For instance, and without limitation, a clustering algorithm may determine a Gaussian or other distribution of questions about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure. Additionally and/or alternatively, the fuzzy set may be incorporated with vehicle data and/or vehicle status.

Figure 7:
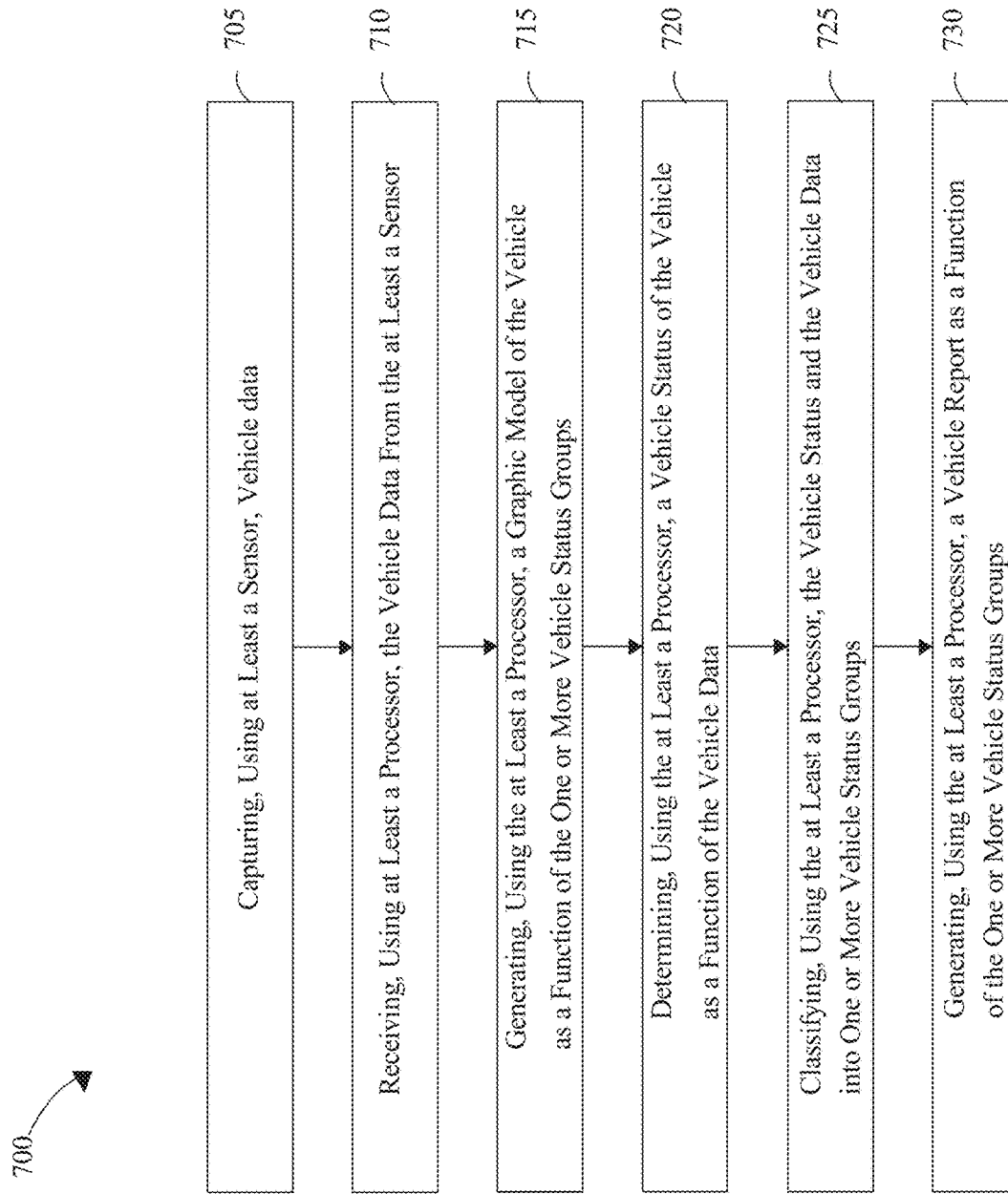
FIG. 7 is a flow diagram illustrating an exemplary method of vehicle profiling.

Referring now to FIG. 7, a flow diagram of an exemplary method 700 for vehicle profiling is illustrated. The method 700 includes a step 705 of capturing, using at least a sensor, vehicle data. In some embodiments, the vehicle data may include image data and the at least a sensor may include a camera. In some embodiments, the method 700 may further include generating, using the camera of the at least a sensor, the image data of the vehicle data. In some embodiments, the vehicle data may include LiDAR data and the at least a sensor may include at least a photodetector of a LiDAR system. In some embodiments, the method 700 may further include generating, using the at least a photodetector of the at least a sensor, the LiDAR data of the vehicle data. This may be implemented as a reference to FIGS. 1-6.

With continued reference to FIG. 7, a method 700 includes a step 710 of receiving, using at least a processor, the vehicle data from the at least a sensor. This may be implemented as a reference to FIGS. 1-6.

With continued reference to FIG. 7, a method 700 includes a step 715 of generating, using at least a processor, a graphic model of a vehicle as a function of one or more vehicle status groups. In some embodiments, the graphic model may include a three dimensional (3D) model of an exterior of the vehicle. This may be implemented as a reference to FIGS. 1-6.

With continued reference to FIG. 7, a method 700 includes a step 720 of determining, using at least a processor, a vehicle status of the vehicle as a function of the vehicle data. In some embodiments, the vehicle status may include a vehicle measurement. In some embodiments, the vehicle status may include a vehicle gate status. In some embodiments, the vehicle status may include a vehicle contamination status. This may be implemented as a reference to FIGS. 1-6.

With continued reference to FIG. 7, a method 700 includes a step 725 of classifying, using at least a processor, a vehicle status and vehicle data into one or more vehicle status groups. This may be implemented as a reference to FIGS. 1-6.

With continued reference to FIG. 7, a method 700 includes a step 730 of generating, using at least a processor, a vehicle report as a function of the one or more vehicle status groups. In some embodiments, the method may further include receiving, using the at least a processor, user data of the vehicle data from a user and generating, using the at least a processor, the vehicle report as a function of the user data of the vehicle data. In some embodiments, the method 700 may further include generating, using the at least a processor, a wash command as a function of a vehicle report. This may be implemented as a reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
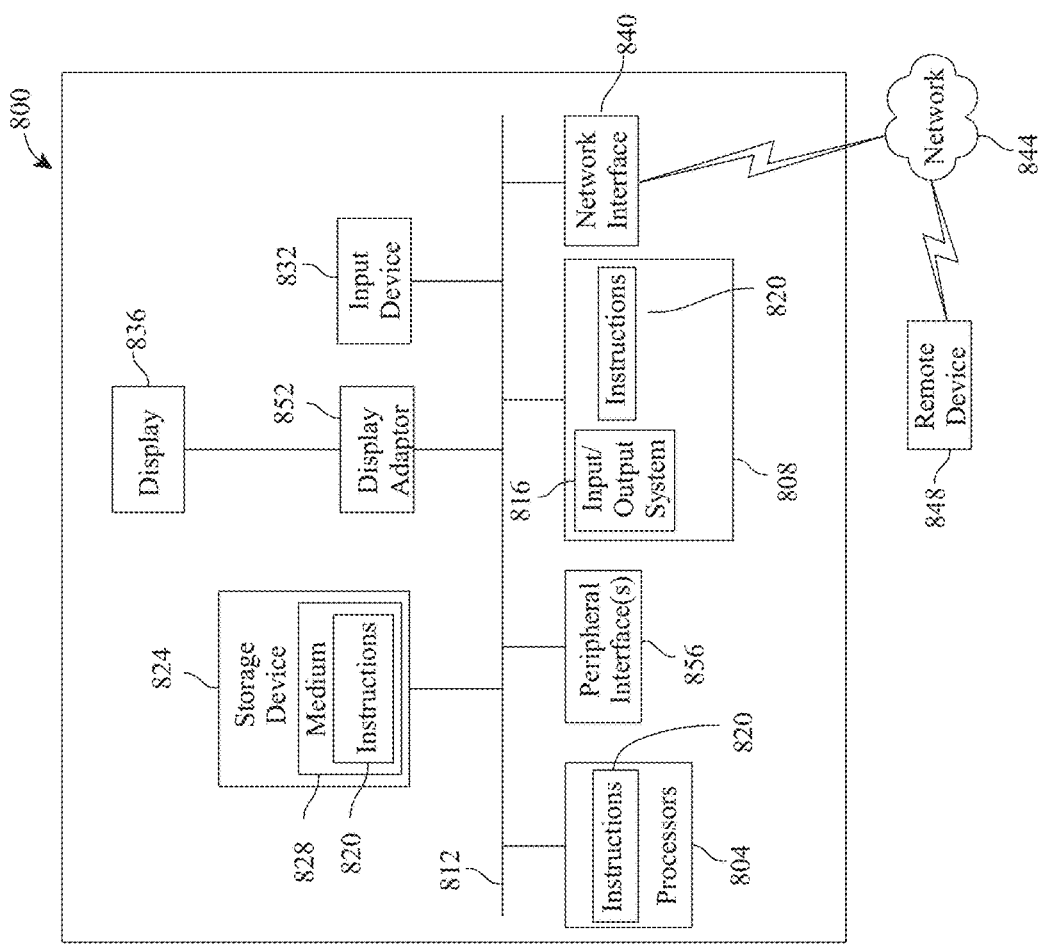
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve apparatuses and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for vehicle profiling, the apparatus comprising:
   at least a sensor, wherein the at least a sensor is configured to capture vehicle data of a vehicle;
   at least a processor;
   at least a vehicle database, wherein the vehicle database is a data structure configured to store data associated with the vehicle, wherein the vehicle database stores previously inputted instructions from a user; and
   a memory communicatively connected to the at least a processor, the memory contains instructions configuring the at least a processor to:
      receive the vehicle data from the at least a sensor;
      generate a graphic model of the vehicle as a function of the vehicle data;
      determine a vehicle status as a function of the vehicle data, wherein the vehicle status further comprises a vehicle contamination status;
      classify the vehicle status and the vehicle data into one or more vehicle status groups wherein the vehicle status comprises at least a vehicle measurement;
      generate a vehicle status report as a function of the one or more vehicle status groups;
      store the vehicle status report in the vehicle database; and
      generate a wash command as a function of the vehicle status report.

2. The apparatus of claim 1, wherein the vehicle status comprises a vehicle damage status.

3. The apparatus of claim 1, wherein the vehicle status comprises a vehicle gate status.

4. The apparatus of claim 1, wherein determining the vehicle status comprises identifying at least a surface model of the vehicle.

5. The apparatus of claim 4, wherein identifying the at least a surface model of the vehicle comprises an edge detection algorithm.

6. The apparatus of claim 4, wherein identifying the at least a surface model of the vehicle comprises an image classifier.

7. The apparatus of claim 1, wherein the one or more vehicle status groups have at least a common attribute.

8. The apparatus of claim 1, wherein the vehicle status and the vehicle data are classified into the one or more vehicle status groups using a group classifier.

9. The apparatus of claim 8, wherein the group classifier is trained using group training data, wherein the group training data correlates the vehicle data and the vehicle status to the one or more vehicle status groups.

10. A method for vehicle profiling, the method comprising:
    providing at least a sensor, wherein the at least a sensor is configured to capture vehicle data of a vehicle;
    providing at least a processor;
    providing at least a vehicle database, wherein the vehicle database is a data structure configured to store data associated with the vehicle, wherein the vehicle database stores previously inputted instructions from a user; and
    providing a memory communicatively connected to the at least a processor, the memory contains instructions configuring the at least a processor to:
       receive the vehicle data from the at least a sensor;
       generate a graphic model of the vehicle as a function of the vehicle data;
       determine a vehicle status as a function of the vehicle data, wherein the vehicle status further comprises a vehicle contamination status;
       classify the vehicle status and the vehicle data into one or more vehicle status groups wherein the vehicle status comprises at least a vehicle measurement;
       generate a vehicle status report as a function of the one or more vehicle status groups store the vehicle status report in the vehicle database; and
       generate a wash command as a function of the vehicle status report.

11. The method of claim 10, wherein the vehicle status comprises a vehicle damage status.

12. The method of claim 10, wherein the vehicle status comprises a vehicle gate status.

13. The method of claim 10, wherein determining the vehicle status comprises identifying at least a surface model of the vehicle.

14. The method of claim 13, wherein identifying the at least a surface model of the vehicle comprises an edge detection algorithm.

15. The method of claim 13, wherein identifying the at least a surface model of the vehicle comprises an image classifier.

16. The method of claim 10, wherein the one or more vehicle status groups have at least a common attribute.

17. The method of claim 10, wherein the vehicle status and the vehicle data are classified into the one or more vehicle status groups using a group classifier.

18. The method of claim 17, wherein the group classifier is trained using group training data, wherein the group training data correlates the vehicle data and the vehicle status to the one or more vehicle status groups.

19. The apparatus of claim 8, wherein the group classifier is a machine-learning model.

20. The method of claim 17, wherein the group classifier is a machine-learning model.

* * * * *